March 11, 1952 M. A. ERICKSON 2,588,374

MARKING APPARATUS

Filed Jan. 29, 1946 4 Sheets-Sheet 1

INVENTOR.
Milford A. Erickson

BY H. A. McGrew

ATTORNEY

March 11, 1952 M. A. ERICKSON 2,588,374

MARKING APPARATUS

Filed Jan. 29, 1946 4 Sheets-Sheet 2

INVENTOR.

Milford A. Erickson

BY

M. A. McCrew

ATTORNEY

March 11, 1952 M. A. ERICKSON 2,588,374

MARKING APPARATUS

Filed Jan. 29, 1946 4 Sheets-Sheet 3

INVENTOR.
Milford A. Erickson

BY
W. A. McGreen

ATTORNEY

March 11, 1952 M. A. ERICKSON 2,588,374

MARKING APPARATUS

Filed Jan. 29, 1946 4 Sheets-Sheet 4

INVENTOR.
Milford A. Erickson

BY

H. A. McGrew

ATTORNEY

Patented Mar. 11, 1952

2,588,374

UNITED STATES PATENT OFFICE 2,588,374

MARKING APPARATUS

Milford A. Erickson, Denver, Colo.

Application January 29, 1946, Serial No. 644,023

11 Claims. (Cl. 93—88)

This invention relates to marking apparatus, and more particularly to apparatus for applying indicating marks, as of ownership or the like, to clothing or other articles, as in dry cleaning establishments, laundries, and places of a similar character.

In dry cleaning establishments, it is customary to write the name of the owner or other identification mark by hand upon a piece of tape or the like, and then staple the piece of tape to the article of clothing. Many times, a considerable number of articles will receive the same identification mark, and it is often a laborious process to write such marks on the pieces of tape. In laundries, it is customary to place identification marks upon clothing by hand, or by a machine which may be set to print a desired mark directly on the article. However, in the case of dark colored articles upon which ink will not show to advantage, it is necessary to place the identification mark upon a separate piece of white or light tape, and then staple the tape to the article. Previous machines developed for printing identification marks on laundry or other articles thus leave much to be desired, since such machines cannot be used for clothing or the like, as in dry cleaning establishments, or for dark colored clothing or the like in laundries.

Among the objects of this invention are to provide an improved apparatus for printing identification marks; to provide such apparatus which will print an identification mark on a piece of tape and simultaneously attach the tape to an article of clothing or the like; to provide such apparatus which can also be used for printing identification marks directly on laundry or other articles; to provide such apparatus which will print the same mark on one or any number of articles, or alternatively attach an identically marked piece of tape to any number of articles in succession; to provide such apparatus which is relatively simple in construction, yet quick and effective in operation; to provide such apparatus which may readily be converted from printing on and simultaneously attaching a piece of tape to an article, to printing an identification mark directly on the article; and to provide such apparatus which will be relatively cheap to construct and requires little skill on the part of an operator. Other objects and the novel features of this invention will become apparent from the description which follows.

Marking apparatus constructed in accordance with this invention may comprise means for supplying a piece of tape or the like, means for printing indicating marks on the piece of tape, means for attaching the piece of tape to an article of clothing or the like, and manually operated means for actuating the tape supplying, printing, and attaching means. Such apparatus may also include means for supplying a continuous tape or the like, and means for severing the tape at a predetermined point to provide a piece of tape to be attached to an article of clothing or the like, such means desirably being operable by a manually actuated arm which also may carry portions of the attaching means and the printing means. The printing means may further include indicia means provided with type characters, selectively movable to different positions to provide different combinations of letters, numbers, or the like. The apparatus may also include means for rendering the tape feeding means inoperative, when the indicating mark is to be printed directly on an article of clothing or the like. Additional features are included in the embodiment illustrated in the accompanying drawings, in which:

Figure 1:
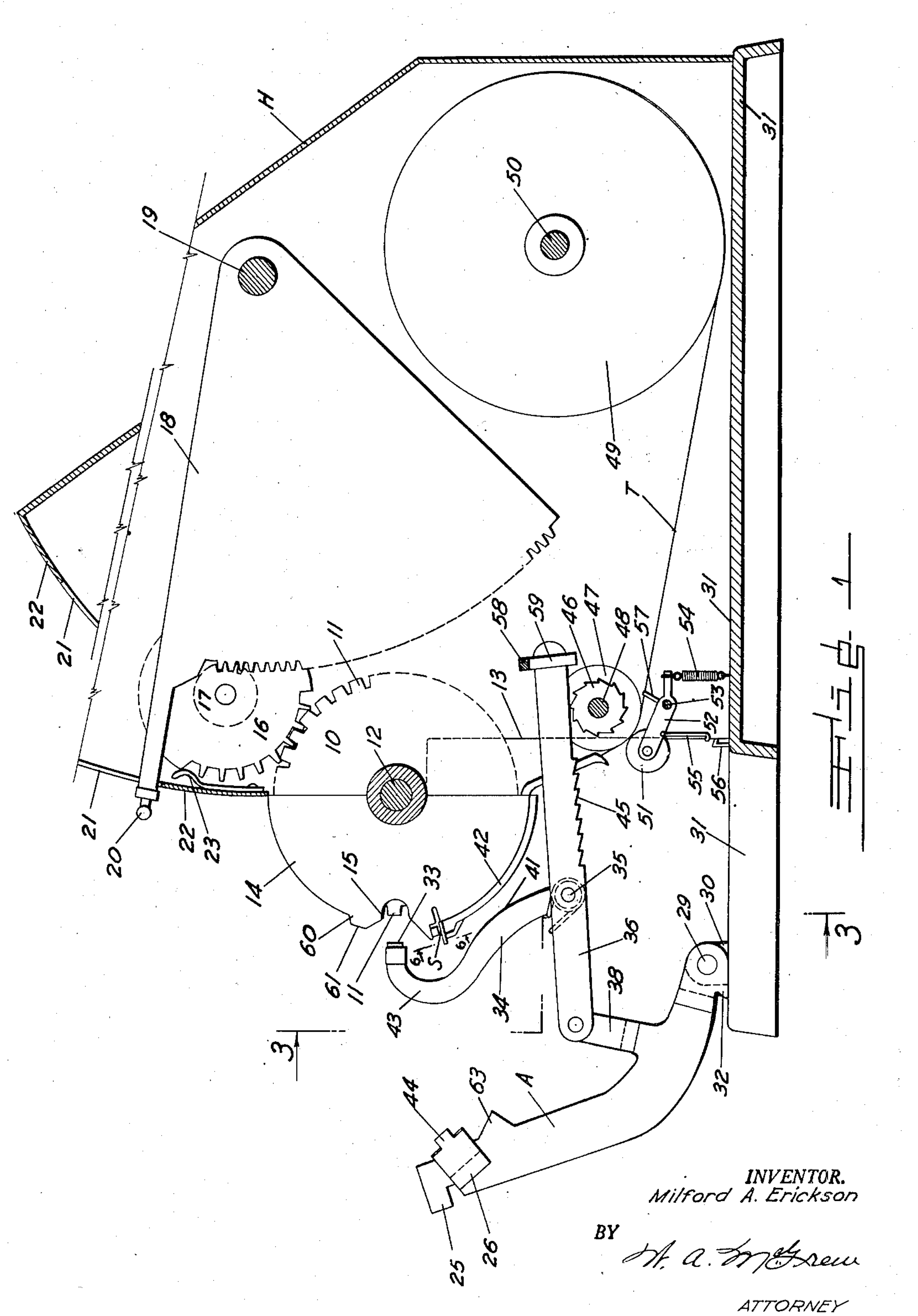
Fig. 1 is a vertical section of apparatus constructed in accordance with this invention, taken along line 1—1 of Fig. 2.
Figure 2:
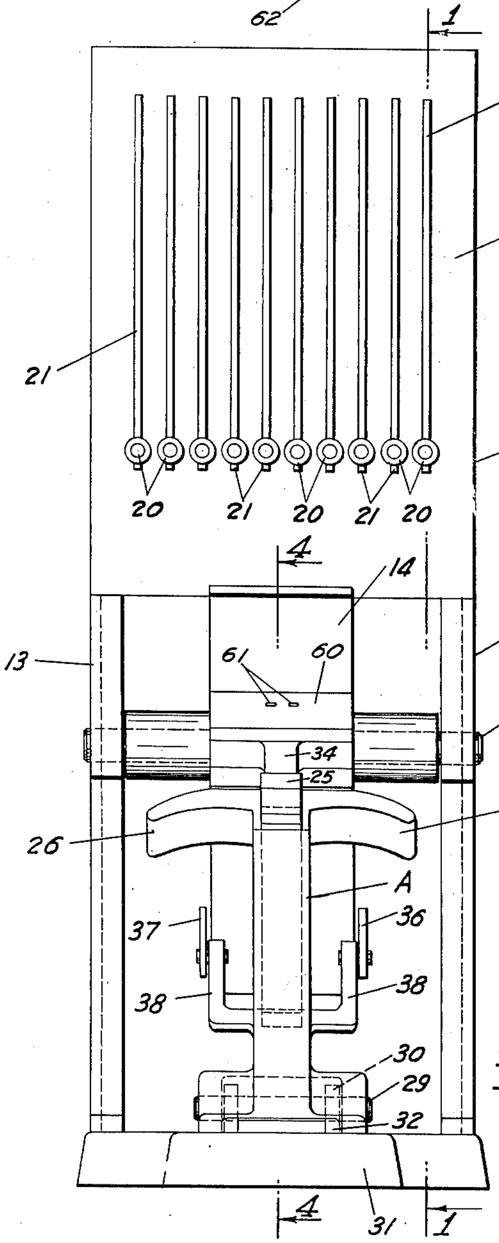
Fig. 2 is a front elevation of the apparatus of Fig. 1.

As illustrated in Figs. 1 and 2 of the drawings, apparatus constructed in accordance with this invention may include a housing H, in the upper portion of which is installed indicia means. The indicia means includes a plurality of circular type wheels 10, provided with raised teeth 11 around the periphery thereof, each tooth 11 carrying a letter, numeral, or other raised type character. Any number of type wheels, such as ten, may be provided, so as to increase the various combinations of letters and numerals which may be used to permit almost any desired indicating mark to be produced. The type wheels 10 are rotatably mounted on a shaft 12, in turn supported at its ends by side walls 13 of housing H, and extending through the sides of a semi-cylindrical housing section 14. Housing section 14 encloses type wheels 10, and is provided with an aperture or opening 15 adapted to expose one row of teeth 11, carrying the type characters for the particular mark to be printed.

Each type wheel 10 is movable by an intermediate gear 16 to a suitable position, as to produce the desired combination of letters or numbers by the teeth 11 exposed in opening 15, and each intermediate gear 16 is formed integrally with or attached to a pinion 17. In turn, each pinion 17 is movable by a quadrant rack 18, pivotal on a shaft 19 with the teeth of each rack meshing with the teeth of the corresponding pinion, and each rack is movable to a desired position by an adjusting lever 20 which extends through a slot 21 in a semi-circular upper section 22 of housing H, as in Fig. 2.

An indicating scale, provided with letters and/or numbers identical with those on the corresponding type wheel 10, is preferably provided alongside each slot 21, so that the operator need only move a lever 20 to a position corresponding to the desired character, and the tooth 11 provided with such character will be moved to a position coinciding with opening 15. To hold the type wheels 10 and racks 19 in the desired positions, a spring 23 may be attached to housing H adjacent each intermediate gear 16, the free end of each spring engaging the teeth of the corresponding intermediate gear 16, as in Fig. 1.

Figure 4:
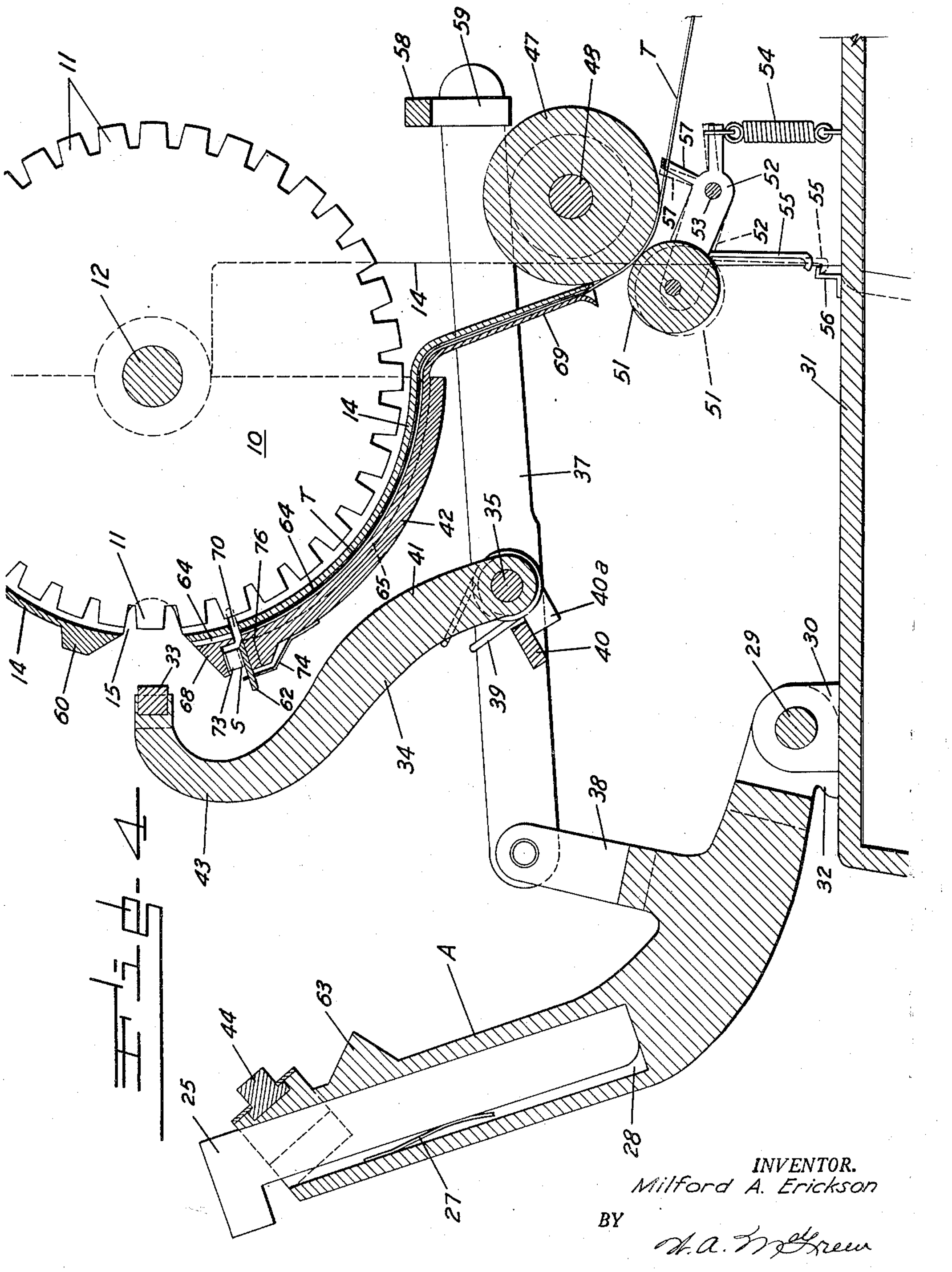
Fig. 4 is an enlarged partial vertical section taken along line 4—4 of Fig. 2.

After the type wheels are set to produce the desired indicating mark in the above manner, an operating arm A is moved forwardly by the operator, a portion 24 of the article of clothing to which the printed piece of tape is to be attached, as in Fig. 1, being placed over a staple supply device 25 and further supported by handles 26 of arm A. Staple supply device 25 is removably mounted on arm A, as in Figs. 1 and 4, being held by a spring 27 in a well 28, formed in the upper end of the arm. Arm A is pivotally mounted at its lower end on a pin 29, mounted in bosses 30 which extend upwardly from base 31 of housing H, and arm A is also provided with a stop 32 at its lower end, to limit rearward movement of the arm to the position of Figs. 1 and 4.

Figure 3:
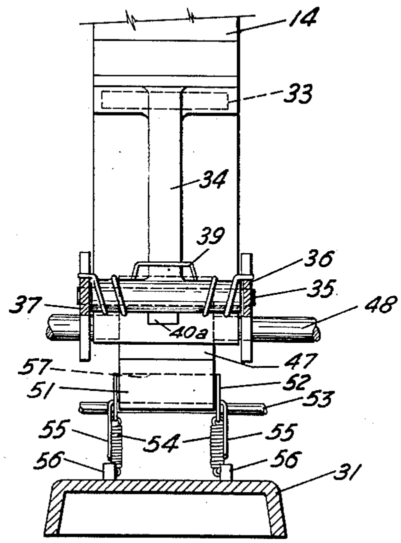
Fig. 3 is a lateral vertical section taken along line 3—3 of Fig. 1.

As arm A is moved forwardly, an inking pad 33, which is preferably formed of a suitable fibrous material saturated with and adapted to retain for a considerable period a supply of a suitable marking ink, is moved into engagement with the teeth 11 which are exposed in opening 15. Inking pad 33 is wedged in a slot, or otherwise suitably attached to the upper end of an arm 34, pivoted at its lower end on a pin 35 extending laterally between a pair of levers 36 and 37, as in Figs. 1 and 4. Levers 36 and 37 are, in turn, pivotally mounted at their rear ends on arms 38 which extend outwardly and upwardly from the lower portion of arm A, so as to move levers 36 and 37 and arm 34 forwardly in a direct movement to cause inking pad 33 to engage the type characters on teeth 11. Arm 34 is maintained in position during such forward movement by a coil spring 39 which encircles pin 35, as in Fig. 3, the ends of the spring engaging levers 36 and 37 and the center of the spring engaging arm 34, as in Fig. 3, so as to urge an abutment 40*a* on arm 34 against a stop bar 40 extending between levers 36 and 37, as in Figs. 2 and 4.

Figure 5:
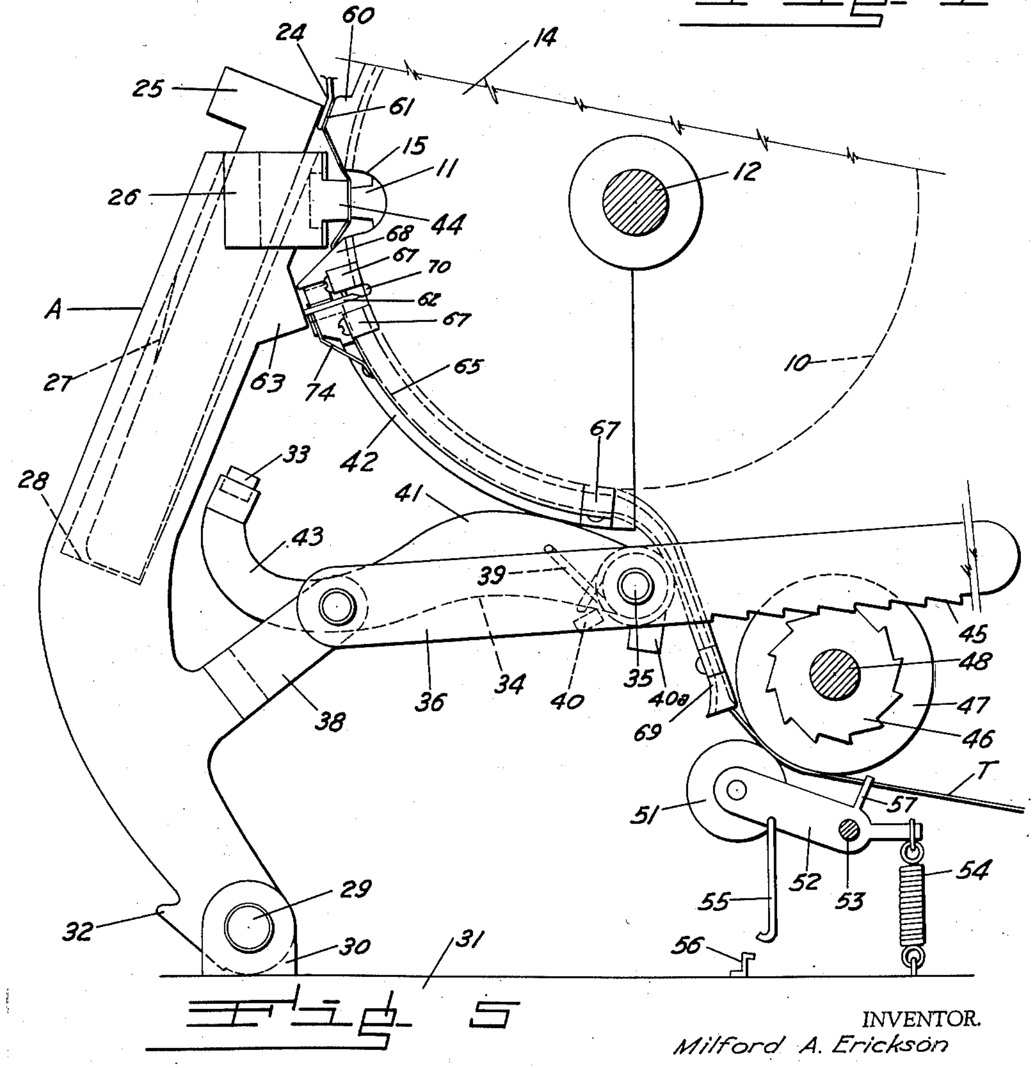
Fig. 5 is an enlarged vertical section similar to Fig. 3, but taken along line 1—1 of Fig. 2 and with certain parts in a different position.

Spring 39 also permits arm 34 to pivot rearwardly and downwardly, after inking and during further forward movement of arm A, when an abutment section 41 of arm 34 engages a cam section 42 of housing section 14 beneath a tape severing or cut off means S, described in detail later. Arm 34 is also provided with an outwardly curved section 43 which permits the inking pad 33 to clear the tape severing means S, as during movement from the position of Fig. 4 to the position of Fig. 5. During such movement, the abutment section 41 causes inking pad 33 to move away from teeth 11, then downwardly and around the tape severing means S, to an unobstructing position, as in Fig. 5, in which the inking pad will not interfere with the operation of a stamping or pressure pad 44, mounted on arm A. Pressure pad 44 is formed of rubber or the like, and is moved into engagement with the piece of tape or article of clothing, on which the indicating mark is to be printed, to press the piece of tape or article against the indicia or type characters previously inked by pad 33.

During forward movement of arm A, as inking pad 33 begins to move away from the opening 15, ratchet teeth 45, formed on the lower side of lever 36, as in Fig. 1, engage the teeth of ratchet wheel 46 to turn a roller 47, ratchet wheel 46 and roller 47 being mounted on and attached to a shaft 48. Roller 47 is adapted to feed the end of the tape across opening 15 and into position for printing, attachment to the article of clothing, and severing of the attached piece of tape by severing means S. As will be evident, the smooth portion of the underside of lever 36 slides over the teeth of ratchet wheel 46, so that the first tooth 45 does not engage ratchet wheel 46 until the inking pad 33 has moved out of the way of the tape, which begins to move upwardly only as soon as the roller 47 begins to turn. On rearward movement of arm A, teeth 45 of lever 36 merely slide over ratchet wheel 46, without moving roller 47 in either direction.

The tape T is supplied from a roll 49, mounted in a suitable position, as on a shaft 50 beneath racks 18, the tape being pulled from roll 49 by driving roller 47, the tape being pressed against roller 47 by an idler or pressure roller 51. The latter is mounted for rotation on two arms 52 which are pivotally mounted on a pin 53 and extend to the opposite side of the pin for attachment of the upper end of springs 54, the lower ends of which are attached to base 31. A hook 55 may be attached to one of arms 52, and a cooperating latch 56 attached to base 31, so that pressure roller 51 may be locked in a down position, such as the dotted position of Fig. 4. Arms 52 are further provided with a U-strip 57, extending between the arms and above the tape T, so that when the roller 51 is locked in the down position, strip 57 will pull the tape T away from driving roller 47, thereby insuring that the tape supply means will be rendered inoperative, as when the indicating marks are to be printed directly on an article of clothing or the like. Levers 36 and 37 are guided during movement by a lateral bar 58 having depending guide legs 59. As will be evident, as soon as abutment section 41 of arm 34 engages cam section 42, levers 36 and 37 are pressed downwardly, so that legs 59 act as lateral guides. Bar 58, however, prevents levers 36 and 37 from rising too high at any time.

The end of the tape is preferably moved across opening 15 and upwardly to a point just beyond a staple closing anvil 60, mounted on or formed integrally with housing section 14 on the opposite side of opening 15 from the tape severing means S. Anvil 60 is provided with a cross slot 61 of conventional shape, so that as the arm A moves to the position of Fig. 5, the staple is pushed through the portion 24 of the article of clothing or the like, and also through the piece of tape, and the ends of the staple are closed by slot 61 in the conventional manner. At the same time, stamping pad 44 presses the tape against the inked tape characters on teeth 11, and the tape is cut off by severing means S, which includes a knife 62 adapted to be pushed inwardly against the tape by an abutment 63 on arm A. After attachment of the piece of tape to the article, arm A is moved, by handles 26, back to the position of Figs. 1 and 4, when the article may be replaced by the next article to which a marked piece of tape is to be attached.

Figure 8:
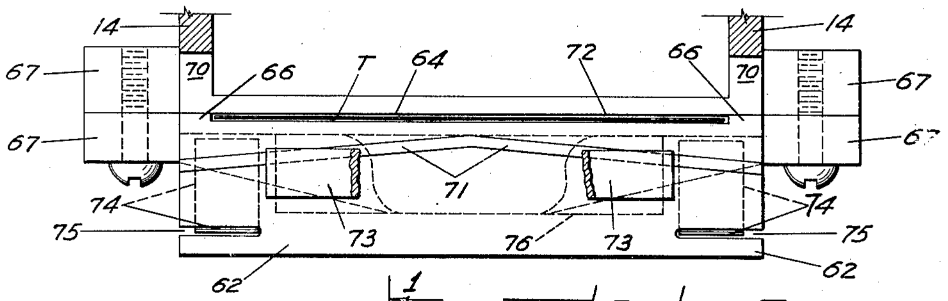
Fig. 8 is a horizontal section, also on a further enlarged scale, taken along line 8—8 of Fig. 6.
Figure 7:
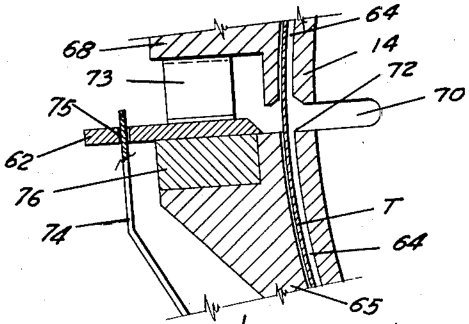
Fig. 7 is a vertical section, on a further enlarged scale, taken along line 7—7 of Fig. 6.

The tape is guided in a slot 64, shown more clearly in Figs. 7 and 8, the slot being formed between the exterior of housing section 14 and a curved strip 65 having side flanges 66 to provide an interior groove, although slot 64 may be provided by flanges on housing section 14, or on both housing section 14 and strip 65. Furthermore, suitable shims or spacing strips may be utilized in lieu of flanges 66. Strip 65 and housing section 14 may also be provided with corresponding ears 67 by which the strip 65 is attached to housing section 14, as by cap screws, as shown. It will be understood, of course, that strip 65 may be attached to housing section 14 in any other suitable manner, as by welding, brazing or the like. An upper guide block 68 is similarly provided with flanges to form a groove to provide a slot for guiding the tape T, and block 68 is provided with ears 66, or may otherwise be suitably attached to housing section 14, as in the same manner as strip 65. Also, if desired, upper guide block 68 may be formed integrally with housing section 14. Strip 65 also may be formed with cam section 42, against which the abutment section 41 of arm 34 rides, as arm 34 is moved from the inking position of Fig. 4 to the unobstructing position of Fig. 5. A tail piece 69 may extend down to a point adjacent tape roller 47, and may be formed in two halves separately from strip 65 and housing section 14 and attached thereto, or formed half as a continuation of strip 65 with the other half attached thereto.

Figure 6:
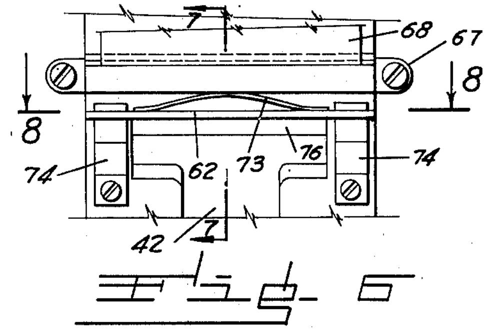
Fig. 6 is a front elevation, on an enlarged scale, of a portion of the apparatus taken from a position along line 6—6 of Fig. 1.

The tape severing means S is illustrated in greater detail in Figs. 6 to 8, inclusive, and is mounted between the upper end of strip 65 and block 68, a slot 70 being provided in housing section 14 to accommodate movement of knife 62. As in Fig. 8, knife 62 is provided with laterally inclined sharpened edges 71, so that the center of the tape is first punctured, and the cutting operation proceeds from the center out to the edges of the tap, the latter being moved against the lower lateral edge 72 of slot 70, which acts as a shearing edge during the cutting operation. The inclination of the cutting edge of the knife produces a cleaner and faster shearing operation. Severing means S also includes a bowed leaf spring 73, the ends of which press knife 62 downwardly, to insure that the knife will move accurately during cutting. A pair of leaf springs 74 move the knife back to the position of Figs. 4 and 7 after cutting, and are attached at their lower ends to strip 65, as in Fig. 6, while the upper ends thereof extend through slots 75 in knife 62, as in Fig. 7.

A wear block 76, formed of hard or hardened metal for more adequately resisting the abrasion tending to be produced by pressure of spring 73, may be attached to the upper end of strip 65 in a suitable manner, as by brazing or soldering, or by screws or the like. Or, in the event that strip 65 is made of material susceptible thereto, the upper end of the strip may be locally hardened, as by flame or induction hardening, so that the wear block may be eliminated. Normally, there will be little wear on shearing edge 72, since the tape is cut rather readily by the knife, but a wear block or localized hardening may be utilized to provide a longer wearing edge, if desired.

When the indicating mark is to be printed directly on the article of clothing, such as in a laundry or the like, the staple supply device 25 is removed from arm A, and the portion of the article on which the indicating mark is to be printed placed over stamping pad 44. Also, hook 55 is locked in latch 56, so that the tape pressure roller 51 is moved downwardly and strip 57 is moved forwardly, to the dotted positions of Fig. 4, so as to move the tape away from roller 47, and eliminate the possibility of the tape accidentally being fed during the marking operation. As will be evident, when the arm A is moved forward under such conditions, the inking pad 33 will ink the type characters as before, but the article of clothing or the like will be pressed into engagement with the inked type characters by stamping pad 44. Also, though the knife 62 will be actuated by abutment 63, no tape will be cut off, since it will not be fed by driving roller 47, while the absence of staple supply device 25 prevents a staple being inserted in the article. After printing in the above manner, arm A is moved rearwardly, and the printed article replaced by the next article, the indicia means I being adjusted for the next article, if necessary, before the next forward movement of arm A. As will be evident, the conversion of the apparatus of this invention to perform tape marking and attaching operations, to article marking operations without tape, is very simple. Furthermore, when it is desired to resume the tape marking and attaching operations, such operations can again be carried out as previously described.

From the foregoing, it will be apparent that the apparatus of this invention fulfills to a marked degree the objects and requirements hereinbefore set forth. The combination of manually operable actuating means, as exemplified by arm A, with printing means, means for supplying a piece of tape, and means for attaching the piece of tape to an article of clothing or the like, comprises a valuable contribution of this invention. Also, the combination of means for supplying a strip of tape or the like, and means for cutting off a piece of the tape and at the same time printing an indicating mark and attaching the piece to an article of clothing or the like, constitutes an additional valuable contribution. As will be evident, the specific construction disclosed is relatively simple in construction and operation, yet numerous changes are possible without changing either the functioning of the parts or the mode of operation of the apparatus.

For instance, the driving roller 47 and ratchet wheel 46 may be placed above levers 36 and 37, with teeth 45 on the upper edge of lever 36, so that the tail piece 69 will extend tangentially from housing 14, instead of at an acute angle, as shown. In such case, a torsion spring, similar to but stronger than spring 39 may be provided at the pivot point of levers 36 and 37, so that lever 36 will be forced upwardly against ratchet wheel 46. Also, a spring pressed latch may be provided to prevent ratchet wheel 46 being turned in the wrong direction by friction, during rearward movement of lever 36.

Knife 62 may be pivoted at one side so as to shear tape T in a manner similar to that of a pair of scissors, while abutment 63 on arm A may be positioned to strike the end of the knife opposite the pivot point. Such a pivoted knife may be swung to one side, so as to prevent its being struck by arm A when the indicating mark is being printed directly on an article of clothing or the like. Furthermore, in the embodiment shown, abutment 63 on arm A may be made removable, as by being held on the arm by a clip spring, and/or fitting into a lateral groove or grooves provided on the front side of arm A. Staple supply device 25 may also be pivotally mounted on arm A, so as to be swung down to a lower rear position, when the indicating mark is to be printed directly on an article of clothing or the like.

In lieu of spring 23, each rack quadrant 18 may be provided with a circumferential slot adjacent the outer end thereof, the slots in all the quadrants being in lateral alignment and provided with teeth or serrations. An alignment bar may extend laterally through the slots, and be mounted at its ends on springs, so that each quadrant can be moved in either direction by lever 20 and the teeth of the slots will move over the alignment bar, but the racks 18 will be maintained in any set position.

Although one embodiment of this invention has been illustrated and described in detail, it will be understood that other embodiments may exist and that additional changes may be made, all without departing from the spirit and scope of this invention.

What is claimed is:

1. Marking apparatus comprising a set of indicia adapted to print indicating marks; means for setting said indicia in desired positions; means for inking said indicia; a pivoted arm carrying means for producing pressure against said inked indicia to cause said marks to be printed; a second pivoted arm carrying said inking means; means for supplying a strip of tape or the like and positioning a portion of said tape at one end thereof in printing position relative to said inked indicia; a knife for cutting said tape strip adjacent said indicia; means carried by said first pivoted arm for operating said knife; and a lever pivoted at one end on said first pivoted arm for actuating said tape supply means so as to move the end portion of said tape into printing position after inking of said indicia, said second pivoted arm being pivoted on said lever.

2. In marking apparatus, adjustable indicia means having type characters for printing indicating marks; a housing for said indicia means provided with an opening exposing the characters for a mark to be printed; a pivoted arm movable toward and away from said opening; tape supply means adapted to move a predetermined length of tape toward and across said opening; tape cutting means disposed on one side of said opening; staple closing means disposed on the opposite side of said opening; staple supply means mounted on said arm in position to move a staple to be closed against said staple closing means; and means carried by said arm for operating said tape cutting means.

3. In marking apparatus, adjustable indicia means having type characters for printing indicating marks; a housing for said indicia means and provided with an opening exposing the type characters for the mark to be printed; a pivoted arm movable toward and away from said opening; tape supply means adapted to move a predetermined length of tape toward and across said opening; tape cutting means disposed on one side of said opening; staple closing means disposed on the opposite side of said opening; staple supply means mounted on said arm in position to move a staple to be closed against said staple closing means; means carried by said arm for operating said tape cutting means; means for inking said indicia characters and operable by movement of said arm prior to obstruction of said opening by said tape; and means for pressing said tape against said inked characters.

4. In marking apparatus, adjustable indicia means having type characters for printing indicating marks; a housing for said indicia means provided with an opening exposing the characters for a mark to be printed; a pivoted arm movable toward and away from said opening; tape supply means adapted to move a predetermined length of tape toward and across said opening; tape cutting means disposed on one side of said opening; staple closing means disposed on the opposite side of said opening; staple supply means mounted on said arm in position to move a staple to be closed against said staple closing means; means carried by said arm for operating said tape cutting means; means for inking said indicia characters and operable by movement of said arm, said inking means being carried by a pivoted arm having a shape to clear said tape cutting means during movement to an unobstructing position after inking; and means for pressing said tape against said inked characters.

5. In making apparatus, adjustable indicia means having type characters for printing indicating marks; a housing for said indicia means provided with an opening exposing the characters for a mark to be printed; a pivoted arm movable toward and away from said opening; tape supply means adapted to move a predetermined length of tape toward and across said opening, said housing being provided with guide slots for said tape; tape cutting means mounted on said housing on one side of said opening; staple closing means mounted on said housing on the opposite side of said opening; staple supply means mounted on said arm in position to move a staple to be closed against said staple closing means; means carried by said arm for operating said tape cutting means; means for inking said indicia characters and operable by movement of said arm prior to obstruction of said opening by said tape; and means for pressing said tape against said inked characters.

6. In marking apparatus, adjustable indicia means having type characters for printing indicating marks; a housing having a base and a section for enclosing said indicia means provided with an opening exposing the type characters for the mark to be printed; a pivoted arm movable toward and away from said opening and carrying a staple supply device and means for producing pressure against inked indicia, said arm being pivoted at its lower end on said base and provided with a stop for limiting rearward movement thereof; a pair of forwardly extending levers pivoted at their rear ends on said arm; tape supply means adapted to move a predetermined length of tape toward and across said opening; tape cutting means disposed on one side of said opening; staple closing means disposed on the opposite side of said opening; means carried by said arm for operating said tape cutting means; a second arm, pivoted on said levers, and carrying means for inking said indicia characters, said second arm having an upper rearwardly curved section to cause said arm to clear said tape cutting means during rearward and downward movement thereof; a cam section on said housing and a cooperating abutment section on said second arm for moving said inking means rearwardly and then downwardly to dispose said second arm in an unobstructing position during movement of said pressure means into said opening; and a ratchet wheel and cooperating teeth on at least one lever for actuating said tape supply means so as to move the end portion of said tape into printing and stapling position after inking of said indicia.

7. In apparatus for marking items of laundry and the like, a frame, indicia means on said frame having type characters for printing indicating marks, tape supply means, rotatable means on the frame for feeding said tape across the indicia means, means for cutting the tape, a pivoted arm movable toward and away from said indicia means, staple supply and driving means on said arm, means on said arm for operating said tape cutting means, and means on said arm for pressing the tape against said characters, a pivoted linkage mechanism attached to said arm for energizing the rotatable tape feeding means, a second arm pivotally mounted on said linkage mechanism, and indicia inking means on said second arm, said arms and linkage mechanism being arranged for successively inking said characters, feeding said tape across the characters, pressing the tape against the inked characters, stapling the tape to the item being marked, and cutting the tape as the first arm is moved forwardly to contact said indicia means.

8. In apparatus for marking items of laundry and the like, a frame, indicia means rotatably mounted on said frame and having type characters for printing indicating marks, tape supply means, rotatable means on the frame for feeding said tape across the indicia means, means for cutting the tape, a pivoted arm movable toward and away from said indicia means, staple supply and driving means on said arm, means on said arm for operating said tape cutting means, and means on said arm for pressing the tape against said characters, a pivoted linkage mechanism attached to said arm for energizing the rotatable tape feeding means, a second arm pivotally mounted on said linkage mechanism, and indicia inking means on said second arm, said arms and linkage mechanism being arranged for successively inking said characters, feeding said tape across the characters, pressing the tape against the inked characters, stapling the tape to the item being marked, and cutting the tape as the first arm is moved forwardly to contact said indicia means.

9. In apparatus for marking items of laundry and the like, a frame, rotatably mounted indicia means on said frame having type characters for printing indicating marks, tape supply means, rotatable means on the frame for feeding said tape across the indicia means, means for cutting the tape, a pivoted arm movable toward and away from said indicia means, means on said arm for pressing the tape against said characters, a pivoted linkage mechanism attached to said arm for energizing the rotatable tape feeding means, a second arm pivotally mounted on said linkage mechanism, and indicia inking means on said second arm, said arms and linkage mechanism being arranged for successively inking said characters, feeding said tape across the characters, pressing the tape against the inked characters, and cutting the tape as the first arm is moved forwardly to contact the said indicia means.

10. In apparatus for marking items of laundry and the like, a frame, indicia means on said frame having type characters for printing indicating marks, tape supply means, rotatable means on the frame for feeding said tape across the indicia means, means for cutting the tape, a pivoted arm movable toward and away from said indicia means, means on said arm for operating said tape cutting means, and means on said arm for pressing the tape against said characters, a pivoted linkage mechanism attached to said arm for energizing the rotatable tape feeding means, a second arm pivotally mounted on said linkage mechanism, indicia inking means on said second arm, and a cam device mounted on said frame to engage said second arm, said arms and linkage mechanism being arranged for successively inking said characters, feeding said tape across the characters, pressing the tape against the inked characters, and cutting the tape as the first arm is moved forwardly to contact the said indicia means.

11. In apparatus for marking items of laundry and the like, a frame, indicia means rotatably mounted on said frame having type characters for printing indicating marks, a pivoted arm movable toward and away from said indicia means, and means on said arm for pressing against said characters, a second arm pivotally mounted on said linkage mechanism, indicia inking means on said second arm, tape supply means, rotatable means on the frame for feeding said tape across the indicia means, means for cutting the tape, and means for disengaging said rotatable means for preventing the feeding of tape, said arms and linkage mechanism being arranged for succesively inking said characters, feeding the tape across the characters when the said rotatable means is engaged, and pressing the tape against the inked characters and cutting the tape as the first arm is moved forwardly to contact said indicia means.

MILFORD A. ERICKSON.

REFERENCES CITED

The following references are of record in the file of this patent:

UNITED STATES PATENTS

| Number | Name | Date |
|---|---|---|
| 954,751 | Mann | Apr. 12, 1910 |
| 960,206 | Silverstein | May 31, 1910 |
| 1,207,818 | Tissot | Dec. 12, 1916 |
| 1,196,114 | Hume | Aug. 29, 1916 |
| 1,217,318 | Kundert | Feb. 27, 1917 |
| 1,931,369 | Arnold et al. | Oct. 17, 1933 |
| 1,969,898 | Mortimer | Aug. 14, 1934 |
| 2,115,760 | Black et al. | May 3, 1938 |
| 2,121,864 | Flood | June 28, 1938 |
| 2,136,461 | Petty | Nov. 15, 1938 |
| 2,251,354 | Gettman | Aug. 5, 1941 |